United States Patent
Dakin et al.

(10) Patent No.: US 8,881,822 B2
(45) Date of Patent: Nov. 11, 2014

(54) NON-AQUEOUS BREAKER FLUIDS AND METHODS OF USE THEREOF

(75) Inventors: Eugene Dakin, Langdon (CA); Chris Shepherd, Katy, TX (US); Steven Young, Cypress, TX (US)

(73) Assignee: M-1 L.L.C., Houston, TX (US)

( * ) Notice: Subject to any disclaimer, the term of this patent is extended or adjusted under 35 U.S.C. 154(b) by 279 days.

(21) Appl. No.: 13/127,290

(22) PCT Filed: Nov. 3, 2009

(86) PCT No.: PCT/US2009/063082
§ 371 (c)(1),
(2), (4) Date: May 3, 2011

(87) PCT Pub. No.: WO2010/053904
PCT Pub. Date: May 14, 2010

(65) Prior Publication Data
US 2011/0214874 A1    Sep. 8, 2011

Related U.S. Application Data

(60) Provisional application No. 61/112,416, filed on Nov. 7, 2008.

(51) Int. Cl.
| | |
|---|---|
| *E21B 37/06* | (2006.01) |
| *C09K 8/52* | (2006.01) |
| *C09K 8/524* | (2006.01) |
| *C09K 8/34* | (2006.01) |

(52) U.S. Cl.
CPC . *C09K 8/524* (2013.01); *C09K 8/34* (2013.01); C09K 2208/26 (2013.01)
USPC .......................................... 166/311; 507/266

(58) Field of Classification Search
CPC ............ C09K 8/00; C09K 8/52; C09K 8/524; C09K 8/528; C09K 8/536; C09K 8/32; C09K 8/34; C09K 8/36; Y10S 507/927; Y10S 507/929; Y10S 507/93; Y10S 507/931; E21B 37/00; E21B 37/06
USPC .................. 166/311; 507/200, 266, 267, 277
See application file for complete search history.

(56) References Cited

U.S. PATENT DOCUMENTS

| | | | |
|---|---|---|---|
| 5,909,774 A | 6/1999 | Griffith et al. | |
| 6,581,687 B2* | 6/2003 | Collins et al. | 166/263 |
| 6,978,838 B2 | 12/2005 | Parlar et al. | |
| 7,140,438 B2 | 11/2006 | Frost et al. | |
| 7,833,943 B2* | 11/2010 | Van Zanten et al. | 507/90 |
| 2002/0023752 A1* | 2/2002 | Qu et al. | 166/308 |
| 2003/0104950 A1* | 6/2003 | Frenier et al. | 507/200 |
| 2006/0073986 A1* | 4/2006 | Jones et al. | 507/129 |
| 2006/0223714 A1 | 10/2006 | Svoboda et al. | |
| 2007/0027253 A1* | 2/2007 | Jones et al. | 524/845 |
| 2007/0265171 A1 | 11/2007 | Javora et al. | |
| 2008/0076682 A1* | 3/2008 | Jones et al. | 507/131 |
| 2008/0110618 A1* | 5/2008 | Quintero et al. | 166/278 |
| 2008/0119374 A1* | 5/2008 | Willberg et al. | 507/209 |
| 2008/0169103 A1 | 7/2008 | Carbajal et al. | |
| 2008/0200354 A1 | 8/2008 | Jones et al. | |
| 2008/0274918 A1* | 11/2008 | Quintero et al. | 507/116 |
| 2009/0221456 A1* | 9/2009 | Harrison et al. | 507/266 |
| 2010/0152069 A1* | 6/2010 | Harris | 507/201 |
| 2010/0300967 A1* | 12/2010 | Dakin et al. | 210/634 |
| 2010/0317549 A1* | 12/2010 | Dakin et al. | 507/129 |

FOREIGN PATENT DOCUMENTS

WO    2009/073438 A2    6/2009

OTHER PUBLICATIONS

Dictionary definitions of "diffusion" and "soluble", accessed Dec. 12, 2013 via thefreedictionary.com.*
Schlumberger Oilfield Glossary entry for "brine", accessed Feb. 25, 2014 via www.glossary.oilfield.slb.com.*
International Search Report issued in PCT/US2009/063082, mailed on May 31, 2010, 3 pages.
Written Opinion issued in PCT/US2009/063082, mailed on May 31, 2010, 4 pages.
Office Action for European Application No. 09825302.4 dated Oct. 24, 2012 (8 pages).
Office Action issued in corresponding European Application No. 09825302.4 dated Jun. 17, 2013 (5 pages).

* cited by examiner

*Primary Examiner* — Blake Michener
(74) *Attorney, Agent, or Firm* — Osha • Liang LLP

(57) ABSTRACT

A method of cleaning a wellbore drilled with an oil-based drilling fluid that forms an oil-based filter cake may include: emplacing a breaker fluid into the wellbore, the breaker fluid comprising: a water-miscible non-aqueous fluid; at least one weighting salt; and at least one breaking agent; and shutting in the well for a period of time sufficient to initiate breaking of the oil-based filter cake.

29 Claims, No Drawings

NON-AQUEOUS BREAKER FLUIDS AND METHODS OF USE THEREOF

BACKGROUND OF INVENTION

1. Field of the Invention

Embodiments disclosed herein relate generally to fluids for use in breaking filter cakes from wellbores. Additionally, embodiments disclosed herein also relate generally to methods of cleaning wellbores.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

One way of protecting the formation is by forming a filter cake on the surface of the subterranean formation. Filter cakes are formed when particles suspended in a wellbore fluid coat and plug the pores in the subterranean formation such that the filter cake prevents or reduce both the loss of fluids into the formation and the influx of fluids present in the formation. A number of ways of forming filter cakes are known in the art, including the use of bridging particles, cuttings created by the drilling process, polymeric additives, and precipitates. Fluid loss pills may also be used where a viscous pill comprising a polymer may be used to reduce the rate of loss of a wellbore fluid to the formation through its viscosity Upon completion of drilling, the filter cake and/or fluid loss pill may stabilize the wellbore during subsequent completion operations such as placement of a gravel pack in the wellbore. Additionally, during completion operations, when fluid loss is suspected, a fluid loss pill of polymers may be spotted into to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location.

After any completion operations have been accomplished, removal of filter cake (formed during drilling and/or completion) remaining on the sidewalls of the wellbore may be necessary. Although filter cake formation and use of fluid loss pills are essential to drilling and completion operations, the barriers can be a significant impediment to the production of hydrocarbon or other fluids from the well if, for example, the rock formation is still plugged by the barrier. Because filter cake is compact, it often adheres strongly to the formation and may not be readily or completely flushed out of the formation by fluid action alone.

The problems of efficient well clean-up and completion are a significant issue in all wells, and especially in open-hole horizontal well completions. The productivity of a well is somewhat dependent on effectively and efficiently removing the filter cake while minimizing the potential of water blocking, plugging, or otherwise damaging the natural flow channels of the formation, as well as those of the completion assembly.

Accordingly, there exists a continuing need for breaker fluids that effectively clean the well bore and do not inhibit the ability of the formation to produce oil or gas once the well is brought into production.

SUMMARY OF INVENTION

In one aspect, embodiments disclosed herein relate to a method of cleaning a wellbore drilled with an oil-based drilling fluid that forms an oil-based filter cake where the method includes: emplacing a breaker fluid into the wellbore, the breaker fluid comprising: a water-miscible non-aqueous fluid; at least one weighting salt; and at least one breaking agent; and shutting in the well for a period of time sufficient to initiate breaking of the oil-based filter cake.

In another aspect, embodiments disclosed herein relate to a method for completing a wellbore that includes drilling the wellbore with an oil-based drilling fluid to form an oil-based filter cake on the walls thereof; gravel packing at least one interval of the wellbore; emplacing a breaker fluid into the wellbore, the breaker fluid comprising: a water-miscible non-aqueous fluid; at least one weighting salt; and at least one breaking agent; and shutting in the well for a period of time sufficient to initiate breaking of the oil-based filter cake.

In yet another aspect, embodiments disclosed herein relate to a breaker fluid that includes about 50 to 90 percent by weight of a non-aqueous base fluid comprising: a water-miscible non-aqueous fluid; at least one weighting salt; about 10 to 50 percent by weight of a breaking agent selected at least one of an emulsifier, a fragmentation agent, an acid source, and a chelant.

Other aspects and advantages of the invention will be apparent from the following description and the appended claims.

DETAILED DESCRIPTION

Embodiments disclosed herein generally relate to non-aqueous breaker fluids and methods of use thereof. In particular, embodiments disclosed herein relate to non-aqueous breaker fluids having a density greater than 11 ppg for use in wellbores in which a higher than conventional density fluid is desired.

As mentioned above, breaker fluids are designed to destroy the integrity of a residual filter cake created during the drilling process by removing some or all drilling fluid components that form the filter cake. Conventionally, such breaker fluids are formed from aqueous base fluids, which are used to break both water- and oil-based filter cakes. When breaking an oil-based filter cake in certain applications, it may be desirable to use a non-aqueous breaker fluid. However, non-aqueous (or oil-based) breaker fluids have not conventionally been practical due to environmental limitations with non-solid weighting agents viewed to be compatible with the base fluid (e.g., CFC, and iron-based agents). The inventors of the present application have discovered that by using a water-miscible non-aqueous solvent as the base fluid, conventional salts, which are compatible with the water-miscible non-aqueous solvents, may be used as the weighting agents. Thus, the breaker fluids of the present disclosure may include a non-aqueous solvent (base fluid) weighted with conventional salts to which a variety of breaker components may be added to form the "breaker" fluid.

Water-miscible non-aqueous solvents suitable for use as the base fluid may include, for example, various glycol-based solvents, which may be weighted up using conventional alkali and alkaline earth metal salts including halides and carboxylates. For example, as shown below, for ethylene glycol and a formate salt, hydrogen bonding may provide for greater compatibility between the solvent and salt:

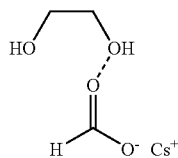

Although the above example uses ethylene glycol, one of ordinary skill in the art would appreciate that other glycols (e.g., diethylene glycol, triethylene glycol, tetraethylene glycol, propylene glycol, dipropylene glycol, tripropylene glycol, tetrapropylene glycol, and the like), alcohol-glycol ethers (e.g., ethylene glycol monobutyl ether, methyl diethylene glycol, ethyl triethylene glycol, propyl tetraethylene glycol, ethyl propylene glycol, methyl dipropylene glycol, propyl tripropylene glycol, and the like), glycerol and glycerol derivatives (e.g., glycerol formal, glycerol 1,3 diglycerolate, glyceroethoxylate, 1,6, hexandiol, and 1,2 cyclohexandiol) may be used.

The base fluid may be weighted up using weighting salts. Such salts may include, but are not limited to alkali metal chlorides, hydroxides, or carboxylates including those based on formate, acetate, citrate, for example, as well as any salt found in sea water. Salts that may be found in seawater include, but are not limited to, sodium, aluminum, potassium, strontium, and lithium salts of chlorides, bromides, carbonates, phosphates, sulfates, silicates, iodides, chlorates, bromates, formates, nitrates, oxides, and fluorides. Thus, no limitation on the presence of other salts is intended to be placed on the present application.

In a particular embodiment, a brine may include halide or carboxylate salts of monovalent cations such as cesium, potassium, and/or sodium or divalent cations such as calcium and magnesium. Such salts may be added in an amount sufficient to weight up the fluid to a final density of greater than 11 ppg in one embodiment, greater than 13 ppg in another embodiment, and greater than 14 or 15 ppg in yet other embodiments. Further, one skilled in the art would appreciate that to have a final density of 11 (13, 14, or 15 ppg or more) once the breaker component has been added to the weighted non-aqueous fluid, it may be necessary to weight up the non-aqueous base fluid to a density of about 20 ppg (or more). The density of the breaker (and base) fluid may be controlled by increasing the salt concentration in the water-miscible solvent (up to saturation), as well as by adding a volume of water to the water-miscible solvent to increase the solubility of the salt in the fluid and achieve even higher densities (20 ppg or more). Thus, the non-aqueous base fluid may include a volume of water ranging from 0 to 40 percent by volume of the total volume of non-aqueous solvent and water combined.

The breaker components (also referred to as breaking agents) which may be added to the weighted non-aqueous base fluid may include a variety of types of breakers including various fragmentation agents, organic acids (including delayed acid sources), and chelants.

Breaking of such filter cakes may occur by exposure of the filter cake to a compound having an oleophilic portion that can penetrate into the filter cake to allow for fragmentation of the filter cake. Such compounds may be referred to herein as fragmentation agents. Fragmentation agents may include, for example, fatty acids, derivatives thereof, hydrocarbon solvents, etc. Such agents may discussed in greater detail in U.S. Patent Application No. 61/088,878, which is assigned to the present assignee and herein incorporated by reference in its entirety. In a particular embodiment, a fragmentation agent may include an alkyl aryl sulfonate, an example of which includes dodecylbenzyl sulfonic acid, to provide for reaction with calcium carbonate in the filter cake. Another embodiment may use fatty acids such as butyric acid (C4), caproic acid (C6), caprylic acid (C8), capric acid (C10), lauric acid (C12), mysristic acid (C14), palmitic acid (C16), stearic acid (C18), etc, in addition to unsaturated fatty acids such as myristoleic acid (C14), palmitoleic acid (C16), oleic acid (C18), linoleic acid (C18), alpha-linoleic acid (C18), erucic acid (C22), etc, or mixtures thereof. In addition to these fatty acids, the compounds may also have a small degree of substitution/branching or may be sulfonic or phosphonic derivatives thereof. Alternatively, fragmentation/penetrability of a filter cake may be achieved (and/or increased) with the use of hydrocarbon solvents such as d-limonene, hexane, decane, xylene, and other $C_2$-$C_{15}$ hydrocarbon solvents, etc.

Suitable organic acids that may be used as the solid breaking agents may include citric acid, salicylic acid, glycolic acid, malic acid, maleic acid, fumaric acid, and homo- or copolymers of lactic acid and glycolic acid as well as compounds containing hydroxy, phenoxy, carboxylic, hydroxycarboxylic or phenoxycarboxylic moieties. In addition to organic acids, hydrolysable esters which may hydrolyze to release an organic (or inorganic) acid may also be used, including, for example, hydrolyzable esters of a $C_1$ to $C_6$ carboxylic acid and/or a $C_2$ to $C_{30}$ mono- or poly-alcohol, including alkyl orthoesters. If, for example, a particular hydrolyzable ester of a $C_1$ to $C_6$ carboxylic acid and/or a $C_2$ to $C_{30}$ poly alcohol were found to be above its melting point at or around the temperature desired for applying the same, then it would be readily understood by one skilled in the art that a longer chain carboxylic acid and/or a longer chain mono- or poly-alcohol could be found that would be a solid in this same temperature range. In addition to these hydrolysable carboxylic esters, hydrolysable phosphonic or sulfonic esters could be utilized, such as, for example, $R^1H_2PO_3$, $R^1R^2HPO_3$, $R^1R^2R^3PO_3$, $R^1HSO_3$, $R^1R^2SO_3$, $R^1H_2PO_4$, $R^1R^2HPO_4$, $R^1R^2R^3PO_4$, $R^1HSO_4$, or $R^1R^2SO_4$, where $R^1$, $R^2$, and $R^3$ are $C_2$ to $C_{30}$ alkyl-, aryl-, arylalkyl-, or alkylaryl-groups. In addition to the said organic acids and hydrolysable esters, hydrolysable anhydrides, amides, and nitriles of said carboxylic moieties or carboxylic esters and be used.

A hydrolysable ester (or other similar compounds) includes compounds which will release acid upon length of time. In particular, compounds that hydrolyze to form acids in situ may be utilized as an organic acid. Such delayed source of acidity may be provided, for example, by hydrolysis of an ester. Illustrative examples of such organic acids that provide for a delayed acid release include hydrolyzable anhydrides of carboxylic acids, hydrolyzable esters of carboxylic acids; hydrolyzable esters of phosphonic acid, hydrolyzable esters of sulfonic acid and other similar hydrolyzable compounds that should be well known to those skilled in the art.

Suitable esters may include carboxylic acid esters so that the time to achieve hydrolysis is predetermined on the known downhole conditions, such as temperature and pH. In a particular embodiment, the delayed pH component may include a formic or acetic acid ester of a $C_2$-$C_{30}$ alcohol, which may be mono- or polyhydric. Other esters that may find use in activating the oxidative breaker of the present disclosure include those releasing $C_1$-$C_6$ carboxylic acids, including hydroxycarboxylic acids formed by the hydrolysis of lactones). In another embodiment, a hydrolyzable ester of a $C_1$ to $C_6$ carboxylic acid and/or a $C_2$ to $C_{30}$ poly alcohol, including alkyl orthoesters, may be used.

In a particular embodiment, an organic acid may be provided in an ranging from about 10 to 50 percent v/v of the wellbore fluid in yet another aspect. However, one of ordinary skill in the art would appreciate that the preferred amount may vary, for example, on the acid or on the rate of hydrolysis for the particular acid source used.

Chelating agents useful as breaking agents in the embodiments disclosed herein sequester polyvalent cations through bonds to two or more atoms of the chelating agent. Cations sequestered by the chelants may be sourced from solid filter cake components including various weighting or bridging agents such as calcium carbonate, barium sulfate, etc. Useful chelating agents may include organic ligands such as ethylenediamine, diaminopropane, diaminobutane, diethylenetriamine, triethylenetetraamine, tetraethylenepentamine, pentaethylenehexamine, tris(aminoethyl)amine, triaminopropane, diaminoaminoethylpropane, diaminomethylpropane, diaminodimethylbutane, bipyridine, dipyridylamine, phenanthroline, aminoethylpyridine, terpyridine, biguanide and pyridine aldazine.

In some embodiments, the chelating agent that may be used may be a polydentate chelator such that multiple bonds are formed with the complexed metal ion. Polydentate chelators suitable may include, for example, ethylenediaminetetraacetic acid (EDTA), diethylenetriaminepentaacetic acid (DTPA), nitrilotriacetic acid (NTA), ethylene glycol-bis(2-aminoethyl)-N,N,N',N'-tetraacetic acid (EGTA), 1,2-bis(o-aminophenoxy)ethane-N,N,N',N'-tetraaceticacid (BAPTA), cyclohexanediaminetetraacetic acid (CDTA), triethylenetetraaminehexaacetic acid (TTHA), N-(2-Hydroxyethyl)ethylenediamine-N,N',N'-triacetic acid (HEDTA), glutamic-N,N-diacetic acid (GLDA), ethylene-diamine tetra-methylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETPMP), amino tri-methylene phosphonic acid (ATMP), salts thereof, and mixtures thereof. However, this list is not intended to have any limitation on the chelating agents suitable for use in the embodiments disclosed herein. One of ordinary skill in the art would recognize that selection of the chelating agent may depend on the metals present downhole in the filtercake. In particular, the selection of the chelating agent may be related to the specificity of the chelating agent to the particular cations, the log K value, the optimum pH for sequestering and the commercial availability of the chelating agent, as well as downhole conditions, etc.

In a particular embodiment, the chelating agent used to dissolve metal ions is EDTA or salts thereof. Salts of EDTA may include, for example, alkali metal salts such as a tetrapotassium salt or tetrasodium salt. However, as the pH of the dissolving solution is altered in the processes disclosed herein, a di- or tri-potassium or salt or the acid may be present in the solution. EDTA is an amino acid, as shown below, with four carboxylate and two amine groups, which may sequester a metal ion as shown below:

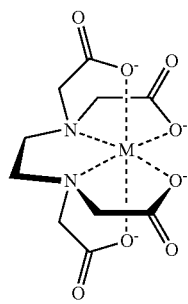

However, to dissolve/sequester some metals (for example, barium), stronger chelating agents may need to be used. For example, of several example chelating agents, the chelating power is, from strongest to weakest, DTPA, EDTA, GLDA, and HEDTA. Thus, incorporation of a chelating agent into a breaker fluid may serve to dissolve and chelate metals present in the filtercake to aid in dissolution/degradation of the filtercake.

The breaker fluid may also optionally contain a mutual solvent, which may aid in reducing surface tension, respectively. For example, where increased penetration rate into the filter cake is desired, a mutual solvent may be preferably included to decrease the viscosity of the fluid and increase penetration of the fluid components into the filter cake to cause fragmentation thereof. Conversely, where additional delay is desired, a lesser amount or zero mutual solvent may be included to increase viscosity and thus reduce penetration rate. One example of a suitable mutual solvent may be a butyl carbitol. The use of the term "mutual solvent" includes its ordinary meaning as recognized by those skilled in the art, as having solubility in both aqueous and oleaginous fluids. In some embodiments, the solvent may be substantially completely soluble in each phase while in select other embodiment, a lesser degree of solubilization may be acceptable. Further, in a particular embodiment, selection of a mutual solvent may depend on factors such as the type and amount of salt present in the fluid.

Further, the breaker fluid may also contain a surfactant, which may aid in dispersing insoluble solids (by promoting water-wetting) from the filter cake upon breaking of the filter cake, or emulsifier to stabilize any aqueous phase present in the fluid (either initially or following breaking of the filter cake). Surfactants (or surface active agents) and emulsifiers have an amphiphilic molecular structure, that is, a structure that is polar (hydrophilic) at one end and nonpolar (lipophilic/hydrophobic) at the other. Generally, hydrophilic groups may be cationic (organic amines—especially with three hydrocarbon chains attached to the nitrogen atom), anionic (fatty acids or sulfates with hydrocarbon chains) or nonionic (organic compounds with oxygen containing groups such as alcohols, esters and ethers) while hydrophobic or lipophilic groups may be large, straight or branched chain hydrocarbons, cyclic hydrocarbons, aromatic hydrocarbons, and/or combinations thereof. One skilled in the art would appreciate that classification of compounds as being a water-wetting surfactant or emulsifier depends on the HLB value of the compound.

Breaker fluids of embodiments of this disclosure be emplaced in the wellbore using conventional techniques known in the art, and may be used in drilling, completion, workover operations, etc. Additionally, one skilled in the art would recognize that such wellbore fluids may be prepared with a large variety of formulations. Specific formulations may depend on the stage in which the fluid is being used, for example, depending on the depth and/or the composition of the formation. The breaker fluids described above may be adapted to provide improved breaker fluids under conditions of high temperature and pressure, such as those encountered in deep wells, where high densities are required. Non-aqueous breaker fluids may find particular use when the filter cake to be broken and/or the fluid present in the well is an oil-based fluid to improve cleaning efficiency and/or compatibility at fluid interfaces Further, one skilled in the art would also appreciate that other additives known in the art may be added to the breaker fluids of the present disclosure without departing from the scope of the present disclosure.

As described above, the breaker fluid may be circulated in the wellbore during or after the performance of at least one completion operation. In other embodiments, the breaker fluid may be circulated either after a completion operation or after production of formation fluids has commenced to destroy the integrity of and clean up residual drilling fluids remaining inside casing or liners.

Generally, a well is often "completed" to allow for the flow of hydrocarbons out of the formation and up to the surface. As used herein, completion processes may include one or more of the strengthening the well hole with casing, evaluating the pressure and temperature of the formation, and installing the proper completion equipment to ensure an efficient flow of hydrocarbons out of the well or in the case of an injector well, to allow for the injection of gas or water. Completion operations, as used herein, may specifically include open hole completions, conventional perforated completions, sand exclusion completions, permanent completions, multiple zone completions, and drainhole completions, as known in the art. A completed wellbore may contain at least one of a slotted liner, a predrilled liner, a wire wrapped screen, an expandable screen, a sand screen filter, a open hole gravel pack, or casing.

Breaker fluids as disclosed herein may also be used in a cased hole to remove any drilling fluid left in the hole during any drilling and/or displacement processes. Well casing may consist of a series of metal tubes installed in the freshly drilled hole. Casing serves to strengthen the sides of the well hole, ensure that no oil or natural gas seeps out of the well hole as it is brought to the surface, and to keep other fluids or gases from seeping into the formation through the well. Thus, during displacement operations, typically, when switching from drilling with an oil-based mud to a water-based mud (or vice-versa), the fluid in the wellbore is displaced with a different fluid. For example, an oil-based mud may be displaced by another oil-based displacement to clean the wellbore. The oil-based displacement fluid may be followed with a water-based displacement fluid prior to beginning drilling or production. Conversely, when drilling with a water-based mud, prior to production, the water-based mud may be displacement water-based displacement, followed with an oil-based displacement fluid. Further, one skilled in the art would appreciate that additional displacement fluids or pills, such as viscous pills, may be used in such displacement or cleaning operations as well, as known in the art.

Another embodiment of the present disclosure involves a method of cleaning up a well bore drilled with an oil based drilling fluid. In one such illustrative embodiment, the method involves circulating a breaker fluid disclosed herein in a wellbore, and then shutting in the well for a predetermined amount of time to allow penetration and fragmentation of the filter cake to take place. Upon fragmentation of the filter cake, the residual drilling fluid may be easily washed out of the well bore. Alternatively, a wash fluid (different from the breaker fluid) may be circulated through the wellbore prior to commencing production.

The fluids disclosed herein may also be used in a wellbore where a screen is to be put in place down hole. After a hole is under-reamed to widen the diameter of the hole, drilling string may be removed and replaced with production tubing having a desired sand screen. Alternatively, an expandable tubular sand screen may be expanded in place or a gravel pack may be placed in the well. Breaker fluids may then be placed in the well, and the well is then shut in to allow penetration and fragmentation of the filter cake to take place. Upon fragmentation of the filter cake, the fluids can be easily produced from the well bore upon initiation of production and thus the residual drilling fluid is easily washed out of the well bore. Alternatively, a wash fluid (different from the breaker fluid) may be circulated through the wellbore prior to commencing production.

However, the breaker fluids disclosed herein may also be used in various embodiments as a displacement fluid and/or a wash fluid. As used herein, a displacement fluid is typically used to physically push another fluid out of the wellbore, and a wash fluid typically contains a surfactant and may be used to physically and chemically remove drilling fluid reside from downhole tubulars. When also used as a displacement fluid, the breaker fluids of the present disclosure may act effectively push or displace the drilling fluid. When also used as a wash fluid, the breaker fluids may assist in physically and/or chemically removing the filter cake once the filter cake has been disaggregated by the breaker system.

In another embodiment, a breaker fluid disclosed herein may be used in the production of hydrocarbons from a formation. Following the drilling of a formation with an oil-based drilling mud, at least one completion operation may be performed on the well. A breaker fluid may then be circulated in the well, and the well may be shut for a predetermined time to allow for breaking of the filter cake formed on the walls therein. Formation fluids may then enter the well and production of the formation fluids may ensue. Alternatively, a wash fluid (different from the breaker fluid) may be circulated through the wellbore prior to commencing production of formation fluid.

EXAMPLE

The following examples are provided to further illustrate the application and the use of the methods and compositions of the present disclosure.

Example 1

Cesium formate was mixed in a non-aqueous solvent (ethylene glycol) to determine its ability to dissolve/disperse and weight up the total fluid to form a weighted and clear mixture. Addition of 10% water increased the achievable density of the solvent-salt mixture. The densities of the prepared weighted fluids are shown in Table 1 below.

TABLE 1

| Solvent | Salt (dry) | Density (Kg/L) | Density (ppg) | Temp (F.) |
|---------|-----------|----------------|---------------|-----------|
| Ethylene Glycol | Cesium Formate dry | 1.751 (saturated) | 14.61 | 75 |
| 90% EG + 10% $H_2O$ | Cesium Formate dry | 1.958 (not saturated) | 16.34 | 78 |

An oil-based drilling fluid (OBM) was formulated to test the compatibility of the cesium formate-weighted 90% EG+10% $H_2O$ fluid (shown in Table 1) with the OBM. The OBM formulation is shown in Table 2 below. Specifically, the components include SUREMUL®, an amidoamine surfactant, SUREWET®, a wetting agent, EMI-1760, a treated micronized bariet, and SAFECARB®, a calcium carbonate bridging solid, all of which are available from M-I LLC (Houston, Tex.).

TABLE 2

| Product | Concentration (ppb) |
|---------|---------------------|
| IO-1618 base oil | 116.6 |
| SUREMUL | 13 |
| SUREWET | 3 |
| LIME | 4 |
| 10.9 $CaCl_2$ Brine | 126.9 |

TABLE 2-continued

| Product | Concentration (ppb) |
|---|---|
| EMI-1760 | 308.2 |
| SAFECARB 2 | 11.5 |
| SAFECARB 10 | 33.5 |
| SAFECARB 20 | 5 |
| OCMA CLAY | 2% (vol/vol) |

The fluid shown in Table 2 was hot rolled for 16 hours at 170° F., and the OCMA clay was added after aging. The OBM was then mixed with the cesium formate-weighted 90% EG+10% $H_2O$ fluid (shown in Table 1) at a 2:1 ratio OBBM:CeCOO-EG-$H_2O$). Mixing provided a homogenous mixture of the two fluids, indicating their compatibility.

A breaker fluid using a cesium formate-weighted ethylene glycol base fluid was formulated as shown in Table 3. ECF-1986 is a chelant and ECF-974 is a delayed organic acid, both of which are available from M-I LLC (Houston, Tex.). TOMADOL® 901 is an alcohol ethoxylate available from Air Products and Chemicals (Allentown, Pa.).

TABLE 3

| Volume | 50.00 | | | |
| Weight | 10.90 | 65.31 | | |
| | % v/v | SG | ppg | ppb |
|---|---|---|---|---|
| ECF-1986 | 19.00 | 1.27 | 10.60 | 12.07 |
| ECF-974 | 9.00 | 1.15 | 9.60 | 5.18 |
| EGMBE | 1.00 | 0.90 | 7.51 | 0.45 |
| Tomadol 901 | 5.00 | 1.00 | 8.35 | 2.50 |
| CsHCOO brine | 14.63 | 2.20 | 18.36 | 16.10 |
| EG | 51.37 | 1.13 | 9.43 | 29.02 |

A small amount of filter cake formed from the OBM shown in Table 2 was introduced into the vial containing to determine the effectiveness of the breaker fluid in dispersing the filter cake. Visual inspection of the filter cake indicated breaking/dispersion of the filter cake.

Example 2

The following formulation (shown in Table 4) was blended to determine the effectiveness of the ethylene glycol fluid that has been weighted with cesium formate. The brine is composed of 50 ml of ethylene glycol with 150 grams of cesium formate which is saturated and the supernatant added to the below formulation.

TABLE 4

| Product | Volume (%) | Specific Gravity | ppg | Ppb |
|---|---|---|---|---|
| EGMBE | 0.10 | 0.90 | 7.51 | 0.09 |
| ECF-974 | 10.00 | 1.15 | 9.60 | 11.50 |
| ECF-1986 | 20.00 | 1.27 | 10.60 | 25.40 |
| EG-CsHCOO | 69.90 | 1.88 | 15.71 | 131.62 |
| | | | Total | 168.61 |

The fluid shown in Table 4 was compared to two water-based breaker fluids, Comparative Fluid 1 and Comparative Fluid 2 shown in Tables 5 and 6.

TABLE 5

Comparative Fluid 1

| Product | Volume (bbl) |
|---|---|
| $ZnBr_2$ Brine - 18.3 ppg | 0.59 |
| Water | 0.1 |
| ECF-1986 | 0.2 |
| ECF-974 | 0.1 |
| EGMBE | 0.01 |

TABLE 6

Comparative Fluid 2

| Product | Volume (bbl) |
|---|---|
| $ZnBr_2$ Brine - 16.1 ppg | 0.8 |
| Hydrochloric Acid (38%) | 0.05 |
| Acetic Acid (glacial) | 0.1 |
| $NH_4Cl$ (dry) | 0.03 |
| EGMBE | 0.02 |

Return to flow tests were performed to evaluate the effectiveness of the non-aqueous breaker fluid as compared to the comparative aqueous based fluids, the results of which are shown in Table 7 below. The return to flow tests were performed as follows: Filter cakes are created on 10 micron aloxite discs using the fluid formulation from Table 2. Initial flows are taken on each 10 micron aloxite using IO 16/18 base-oil using the time for 200 milliliters to flow through the disc. A 16 hour filter cake (170° F., 500 psi differential) is re-established. The delay period is accessed by opening the bottom valve and measuring the time or rate as 30 mL of filtrate is collected. Once that parameter or 30 minutes has transpired, then the differential pressure is reduced to 50 psi and the breakers are periodically checked until breakthrough occurred. After the stated soak period, each breaker/residual filter cake is tested for percent return of initial flow (in the production direction using IO 16/18 base-oil). The baseline of the RDF system was tested as above, but the final flow was performed after the 16 hour filter cake had been built and no soaking with any breaker system.

| Product | Initial Flow (seconds) | Final Flow (seconds) | Return to Flow (%) | Delay Time |
|---|---|---|---|---|
| Baseline | 21.89 | 70.53 | 31 | n/a |
| Comparative Fluid 1 | 21.68 | 56.89 | 38 | 6 days |
| Comparative Fluid 2 | 22.12 | 57.77 | 38 | None |
| NAF Breaker | 21.78 | 51.92 | 42 | 6 days |

Embodiments of the present disclosure may provide for at least one of the following advantages. When breaking an oil-based filter cake, in certain applications it may be desirable to use a non-aqueous breaker fluid instead of conventional aqueous based breaker fluids. The breaker fluids of the present disclosure use a water-miscible non-aqueous solvent as the base fluid, which allows for the use of conventional salts as the weighting agent, whereas conventionally oil-based breaker fluids have not been practical due to environmental limitations with non-solid weighting agents viewed to be compatible with the base fluid (e.g., CFC, and iron-based agents). Additionally, use of such salts as weighting agents may allow for densities of greater than 11 ppg (the conventional upper limit for oil-based breaker fluids) to be formulated, rendering the breaker fluids particularly suitable for use in deep, high pressure, high temperature wells.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of cleaning a wellbore drilled with an oil-based drilling fluid that forms an oil-based filter cake, the method comprising:
    emplacing a non-emulsified single phase breaker fluid into the wellbore, the breaker fluid comprising:
        at least 60% by volume of a water-miscible non-aqueous fluid forming a continuous phase;
        at least one weighting salt; and
        at least one breaking agent; and
    shutting in the well for a period of time sufficient to initiate breaking of the oil-based filter cake.

2. The method of claim 1, wherein the water-miscible non-aqueous fluid comprises at least one of ethylene glycol, propylene glycol, glycerol, diethylene glycol, triethylene glycol, dipropylene glycol, and tripropylene glycol.

3. The method of claim 1, wherein the weighting salt comprises at least one alkali carboxylate salt, alkali halide salt, alkaline earth carboxylate salt, or alkaline earth halide salt.

4. The method of claim 1, wherein the at least one breaking agent comprises at least one of a fragmentation agent, an acid source, and a chelant.

5. The method of claim 1, the breaker fluid further comprising:
    at least one of a surfactant and an emulsifier.

6. The method of claim 1, the breaker fluid further comprising:
    at least one mutual solvent.

7. The method of claim 1, the breaker fluid further comprising: water.

8. The method of claim 1, wherein the breaker fluid has a density greater than 11 ppg.

9. The method of claim 8, wherein the breaker fluid has a density greater than 14 ppg.

10. The method of claim 1, further comprising:
    initiating production of formation fluids through the wellbore.

11. The method of claim 1, further comprising:
    performing at least one completion operation in the wellbore.

12. The method of claim 1, wherein the at least one weighting salt is dissolved in the water-miscible non-aqueous fluid.

13. A method for completing a wellbore, comprising:
    drilling the wellbore with an oil-based drilling fluid to form an oil-based filter cake on the walls thereof;
    gravel packing at least one interval of the wellbore;
    emplacing non-emulsified a single phase breaker fluid into the wellbore, the breaker fluid comprising:
        at least 60% by volume of a water-miscible non-aqueous fluid forming a continuous phase;
        at least one weighting salt; and
        at least one breaking agent; and
    shutting in the well for a period of time sufficient to initiate breaking of the oil-based filter cake.

14. The method of claim 13, wherein the water-miscible non-aqueous fluid comprises at least one of ethylene glycol, propylene glycol, glycerol, and diethylene glycol.

15. The method of claim 13, wherein the weighting salt comprises at least one alkali carboxylate salt, alkali halide salt, alkaline earth carboxylate salt, or alkaline earth halide salt.

16. The method of claim 13, wherein the at least one breaking agent comprises at least one of an emulsifier, a fragmentation agent, an acid source, and a chelant.

17. The method of claim 13, the breaker fluid further comprising:
    at least one surfactant.

18. The method of claim 13, the breaker fluid further comprising:
    at least one mutual solvent.

19. The method of claim 13, the breaker fluid further comprising: water.

20. The method of claim 13, further comprising:
    initiating production of formation fluids through the wellbore.

21. The method of claim 13, further comprising:
    performing at least one completion operation in the wellbore.

22. The method of claim 13, wherein the at least one weighting salt is dissolved in the water-miscible non-aqueous fluid.

23. A breaker fluid, comprising:
    about 50 to 90 percent by weight of a non-aqueous base fluid comprising:
        at least 60% by volume of a water-miscible non-aqueous fluid forming a continuous phase;
        at least one weighting salt; and
    about 10 to 50 percent by weight of a breaking agent selected at least one of an emulsifier, a fragmentation agent, an acid source, and a chelant;
    wherein the breaker fluid is a non-emulsified single phase fluid.

24. The fluid of claim 23, wherein the water-miscible non-aqueous fluid comprises at least one of ethylene glycol, propylene glycol, glycerol, and diethylene glycol.

25. The fluid of claim 23, wherein the weighting salt comprises at least one alkali or alkaline earth salt of a carboxylate or halide.

26. The fluid of claim 23, further comprising:
    at least one surfactant.

27. The fluid of claim 23, further comprising:
    at least one mutual solvent.

28. The fluid of claim 23, further comprising:
    water.

29. The breaker fluid of claim 23, wherein the at least one weighting salt is dissolved in the water-miscible non-aqueous fluid.

* * * * *